April 3, 1934.  F. O. ANDRES  1,953,330
MEANS FOR COATING WITH METAL
Filed Oct. 5, 1929
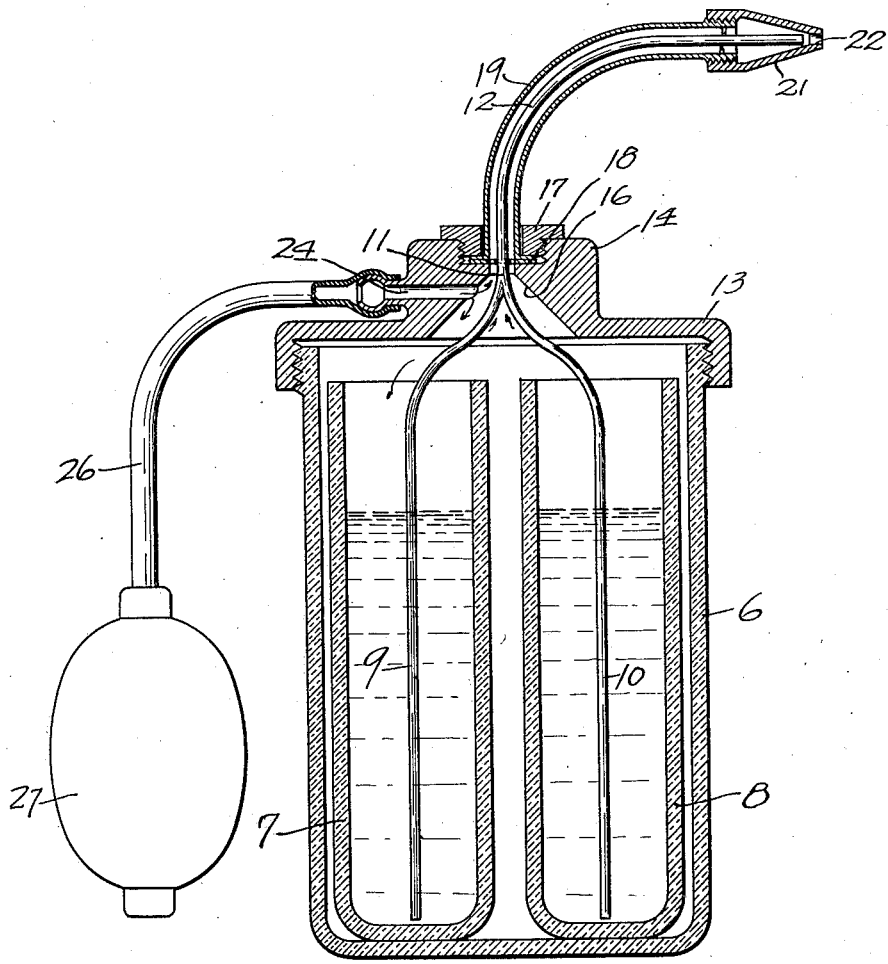
INVENTOR.
FELIX O. ANDRES
BY
ATTORNEY.

Patented Apr. 3, 1934

1,953,330

UNITED STATES PATENT OFFICE 1,953,330

MEANS FOR COATING WITH METAL

Felix O. Andres, San Francisco, Calif.

Application October 5, 1929, Serial No. 397,574

3 Claims. (Cl. 91—45)

This invention relates to a process, and means for applying gold or the like metal to glass surfaces or the like.

It is the primary object of the invention to dispense with the necessity of applying gold to glass surfaces in leaf form and by the aid of brush, which is the process widely used at present, and to provide a new process for applying the gold or like metal, in a liquid form, precipitating at the point of impingement on the glass surface, to form an even, unbroken film, or surface, of uniform color, by which new process the cost and the time of manufacture of a coated article, or of gold lettering is materially reduced. My process of gilding may be performed anywhere regardless of draught or wind at the surface gilded or lettered; the resulting gilding or gold lettering having a high burnish or lustre, and being sufficiently transparent to allow clear vision of the design on the glass, while the decorating or lettering is executed.

Another object of the invention is the provision of a process in which a certain metal solution, is mixed and sprayed with another chemical solution, so that the metal, such as gold, precipitates and is deposited at the point of impingement of the solution on the glass surface.

Another object of the invention is the provision of a sprayer to spray the solutions upon the glass surface in such a manner as to prevent the precipitation of the decorative metal before the impingement of the solutions upon the glass surface.

The sprayer thru which my process is performed is clearly illustrated in the accompanying drawing wherein the figure is a sectional view of the sprayer.

In employing my improved process the surface of the glass to be coated, or lettered, is chemically cleaned to remove foreign substances therefrom. After cleaning the surface in any conventional manner, I metalize the surface, by applying thereto a metalizing solution to form a substantially non-soluble film on the glass surface. In the present illustration I apply to the surface a mixture of tin chloride in distilled water, one grain of tin to every ounce of distilled water. Then clean water is applied by a brush to wash off the tin solution.

After the surface is thus cleaned and metalized it is prepared to receive the gilding solutions.

I use two solutions, and for clearness of description, will number the same solution one and solution two.

Solution one is a metallic solution such as a mixture of gold chloride solution with potassium carbonate (pure) or sodium carbonate (pure) solution. The gold chloride solution consists of one part, by weight, of gold chloride in 32 parts, by weight, of distilled water. The potassium, or sodium carbonate solution, consists of one part, by weight, of potassium or sodium, as the case may be, and eight parts, by weight, of distilled water.

Solution two is a reducing solution adapted to react with the metallic solution used and with the surface to be coated, such as a solution prepared out of one part, by weight, of potassium carbonate, or sodium carbonate (pure) in eight parts, by weight, of distilled water, and out of one part, by weight, of formaldehyde in sixteen parts, by weight, of distilled water. The two last mentioned solutions are mixed together, and to the resultant solution is added from one to five grains of basic mercuric salicylate, or other salts of mercury that are not affected by carbonate. The use of this last named metal permits the production of all the shades from deep gold to green yellow.

Solutions one and two are then sprayed in equal proportions upon the glass surface, so that both solutions impinge on the glass plate at the same moment, whereupon the gold is deposited on the surface. In order to prevent the deposition of the metal upon the conduits of the sprayer, the reaction solutions are kept separately and are mixed only shortly before leaving the sprayer. In my spraying means I made use of a glass jar 6, in which are positioned two separate glass or celluloid containers 7 and 8. Into the containers 7 and 8 extend tubes 9 and 10 respectively. The tubes 9 and 10 are preferably made of metal, and the open free ends thereof are disposed in close proximity above the bottom of the respective containers. The tubes 9 and 10 are united at 11, into a unitary curved conduit 12 above the jar 6.

The upper end of the jar 6 is threaded to receive a metal screw top 13 thereon. A central boss 14 is formed on the top 13, which has a conical recess 16 therein, in which the joint 11 is positioned. Below the packing gland 17 in the boss 14 is attached a spider 18 to hold the tube 12 in place. The screw packing gland 17 also secures in place the flange of an outer tube 19, curved to receive the conduit 12 therein. At the free end of the outer tube 19 is threadedly fastened a spray tip 21, which has a conical passage therein, leading to a central nozzle orifice 22. The spacing of the outer end of the metal conduit 12 from the orifice 22 is readily adjusted by screwing or unscrewing the tip 21.

A transverse passage 24 in the boss 14 extends from the outer periphery of the boss 14 into the side of the recess 16. On the periphery of the boss 14, at the outer end of the passage 24, is attached the end of a rubber hose 26, the other end of which is connected to a rubber bulb 27, operating in the usual manner.

In operation solution one is disposed in the container 7, and solution two is in the container 8. Preferably there is an equal amount of solution in each container. When the bulb 27 is compressed, increased air pressure is created within the top of the jar 6. The air pressure urges the solutions one and two, into the respective separate tubes 8 and 10, with equal force. At this time the air pressure also fills the outer conduit 19 and produces an out rush of air thru the orifice 22, thus a suction is created at the end of the conduit 12, which draws the solutions out of the tubes 9 and 10 into the conduit or stem 12, and sprays or atomizes the mixed solution thru the orifice 22 onto the surface gilded.

It is to be noted, that the conduit or stem 12 is comparatively short, and in operation the orifice 22 is to be held in close proximity to the surface gilded or silvered, therefore solutions one and two are not permitted to travel together sufficiently long to precipitate or deposit the metal before the impingement of the solutions upon said surface. The sprayer heretofore described is light and readily portable. It is readily carried above or in front of the surface coated. The solutions in the atomizer are so balanced as to be drawn evenly from both containers 7 and 8, and the conduit or stem 12 mixes the solutions thoroughly, so that the metal is deposited instantly upon the surface.

After sufficient deposit is obtained on the surface, a thin coat of tin chloride solution is applied, and preferably a chamois skin is used to dry up the surface. The gilded or coated surface has sufficient transparency, to allow clear vision of the design or lettering on the other side of the glass, thus the work is readily executed, and a back ground is applied in accordance with the design, whereupon the surface is cleaned, to leave a coating thereon of the desired shade, high burnish and lustre.

The above solutions are particularly adapted to be applied by spraying. The process heretofore described allows the execution of gold lettering, for instance, in one quarter of the time it takes to apply gold leaf, furthermore, air currents do not hinder the work, and the resulting coating is uniform, and of the desired shade. The process of spraying is not confined to gilding only, it may be used in connection with other metals that can be similarly deposited by chemical reactions.

Having thus described this invention, what I claim and desire to secure by Letters Patent is:

1. A spraying apparatus of the character described comprising a plurality of vessels containing liquid solutions; an element covering all the vessels and having a duct therein in simultaneous communication with all the vessels above the fluid level in said vessels; a jet conduit in the duct being spaced from the walls of the duct, said duct having a spray orifice at the discharge end of the jet conduit, said jet conduit being forked at its intake end, the branches of said forked end extending into the respective vessels to simultaneously conduct the various solutions to the said jet conduit, a compressed air intake operatively related to and communicating both with the said duct and with the said vessels to simultaneously create pressure above the fluid in all the vessels, and also to create a forced flow through the duct to draw the mixed fluids from the discharge end of the jet conduit and spray the same.

2. In an apparatus of the character described, a container a plurality of vessels for various solutions in the container, said container having an air duct extended from the top thereof, said duct terminating in an orifice, a jet conduit extending through said duct to a point adjacent the orifice of the latter, the intake end of the conduit being forked having a branch conduit extended in each vessel to simultaneously conduct the respective solutions to the jet conduit, said container having an air intake thereon to conduct compressed air into said duct and to said vessels, thereby to force the solutions into said jet conduit, and to draw the mixed solutions out of the discharge end of said conduit at the orifice of said duct.

3. In an apparatus of the character described a container having a plurality of fluid containing compartments and a closed air chamber above said compartments, and having an air duct extended outwardly from said chamber, said chamber having an air intake thereon, a jet conduit extended into the duct to a point adjacent to the outlet orifice of the duct; a plurality of branches at the inner end of the jet conduit to simultaneously communicate the conduits with the fluids in the respective compartments; and means to force air under pressure through said intake into the said chamber thereby forcing the fluid simultaneously from all the compartments into said branches and the conduit, and creating a forced air current through the duct to produce a suction air flow at the discharge end conduit to draw the mixed fluids therefrom in a spray.

FELIX O. ANDRES.